United States Patent
Rinn et al.

(10) Patent No.: US 10,781,350 B2
(45) Date of Patent: Sep. 22, 2020

(54) METHOD FOR PRODUCING A LATENT HEAT ACCUMULATOR AND LATENT HEAT ACCUMULATOR

(71) Applicants: SCHUNK CARBON TECHNOLOGY GMBH, Bad Goisern (AT); SCHUNK KOHLENSTOFFTECHNIK GMBH, Heuchelheim (DE)

(72) Inventors: Günter Rinn, Lahnau (DE); Klaus Reiser, Bad Ischl (AT)

(73) Assignees: SCHUNK CARBON TECHNOLOGY GMBH, Bad Goisern (AT); SCHUNK KOHLENSTOFFTECHNIK GMBH, Heuchelheim (DE)

( * ) Notice: Subject to any disclaimer, the term of this patent is extended or adjusted under 35 U.S.C. 154(b) by 155 days.

(21) Appl. No.: 16/082,643

(22) PCT Filed: Mar. 7, 2017

(86) PCT No.: PCT/EP2017/055314
§ 371 (c)(1),
(2) Date: Sep. 6, 2018

(87) PCT Pub. No.: WO2017/157723
PCT Pub. Date: Sep. 21, 2017

(65) Prior Publication Data
US 2019/0071594 A1    Mar. 7, 2019

(30) Foreign Application Priority Data
Mar. 14, 2016    (DE) .................. 10 2016 104 661

(51) Int. Cl.
*C09K 5/06*    (2006.01)
*F28F 21/02*    (2006.01)
*F28D 20/02*    (2006.01)

(52) U.S. Cl.
CPC ............ *C09K 5/063* (2013.01); *F28D 20/023* (2013.01); *F28F 21/02* (2013.01); *F28F 2255/00* (2013.01); *Y02E 60/145* (2013.01)

(58) Field of Classification Search
CPC ........ C09K 5/063; F28D 20/023; F28F 21/02; F28F 2255/00; Y02E 60/145
See application file for complete search history.

(56) References Cited

U.S. PATENT DOCUMENTS

| 5,194,198 A | 3/1993 | von Bonin et al. |
| 5,382,387 A | 1/1995 | von Bonin |

(Continued)

FOREIGN PATENT DOCUMENTS

| JP | H01264967 A | 10/1989 |
| JP | H6-24848 | 2/1994 |

(Continued)

OTHER PUBLICATIONS

Japanese Patent Office Action (English translation), dated Nov. 19, 2019, for Japanese Application No. 2018-568486.

(Continued)

*Primary Examiner* — Ryan J. Walters
(74) *Attorney, Agent, or Firm* — Ladas & Parry LLP; Malcolm J. MacDonald

(57) ABSTRACT

The invention relates to a method for producing a latent heat accumulator of expanded graphite by expanding a graphitic starting material. The invention is characterized in that the graphitic starting material is introduced into a mold which corresponds at least in sections to the negative mold of the latent heat accumulator, and that the graphitic starting material is subsequently expanded in the closed mold.

13 Claims, 2 Drawing Sheets

(56) References Cited

U.S. PATENT DOCUMENTS

| | | | |
|---|---|---|---|
| 5,543,230 | A | 8/1996 | von Bonin et al. |
| 7,704,405 | B2 | 4/2010 | Ottinger et al. |
| 8,580,171 | B2 | 11/2013 | Christ et al. |
| 2002/0060063 | A1 | 5/2002 | Neuschutz et al. |
| 2007/0224425 | A1 | 9/2007 | Christ et al. |
| 2012/0240919 | A1* | 9/2012 | Baumann ............... C09K 5/063 126/400 |
| 2013/0264023 | A1 | 10/2013 | Hudler et al. |

FOREIGN PATENT DOCUMENTS

| | | |
|---|---|---|
| JP | 2002-20738 | 1/2002 |
| JP | 2007-160066 A | 6/2007 |
| JP | 2013-170144 A | 9/2013 |
| WO | 2011/124624 A1 | 10/2011 |

OTHER PUBLICATIONS

International Search Report, dated May 23, 2017, corresponding to Application PCT/EP2017/055314.

\* cited by examiner

METHOD FOR PRODUCING A LATENT HEAT ACCUMULATOR AND LATENT HEAT ACCUMULATOR

The invention relates to a method for producing a latent heat accumulator, wherein a phase change material is introduced into a molded body produced by expanding a graphitic starting material. The invention also relates to a latent heat accumulator.

Latent heat accumulators use thermodynamic state changes of a storage medium, wherein predominantly a solid/liquid phase transition and vice versa is used.

EP 1 837 617 B1 discloses a latent heat accumulator having a molded body which is produced by isostatically pressing a mixture of a phase change material and an exfoliated graphite material.

To achieve an optimum effect, a variety of mixtures of phase change materials and exfoliated graphite is known, such as disclosed in DE 102 50 249 A1 or EP 1 416 027 B1.

According to EP 1 416 027 B 1, a mixture of a phase change material and particulate expanded graphite, which is pressed into a molded body, is used to produce a latent heat accumulator.

According to WO 2013/153067 A1, a pressed graphite plate impregnated with a phase change material is used to produce a latent heat accumulator.

Expanded graphite is usually first pressed to form a molded body and then infiltrated with the phase change material. However, it is also possible to first mix expanded graphite and a phase change material and subsequently mold the resulting mixture under pressure to form a molded body (see e.g. EP 1 416 027 B1).

Producing complex geometries of such expanded molded bodies frequently poses problems.

Pressing the expanded graphite material changes pore volumes and channel courses in the expanded graphite material, which may have the disadvantage that, after molding, the infiltration with the phase change material does not take place to the required or desired extent.

The present invention is based on the task of improving a method of the type mentioned above and a latent heat accumulator in such a way that the desired geometries of the molded body to be produced can be easily provided. According to another aspect, the infiltration should not be negatively influenced by the molding.

To solve this task, mainly the following is proposed:
Introducing the graphitic starting material into a mold,
Closing the mold,
Expanding the graphitic starting material by introducing heat, wherein the mold is heated before or after the graphitic starting material is introduced or the energy required for expansion is introduced directly into the graphitic starting material,
After the molded body has been formed, introducing the phase change material.

By way of derogation from the state of the art, the graphitic starting material to be expanded is expanded in a mold that predefines the shape of the molded body. Therefore, no molding under pressure is required after expanding the graphitic starting material, in particular graphite salt, with the effect that no changes occur with respect to porosity and/or the channels running in the expanded material. This has advantages with regard to the infiltration of the phase change material when producing a latent heat accumulator.

This is particularly advantageous for components with significant changes in cross-section, as it results in a more uniform compaction and homogeneous pore structure as compared to the state of the art.

In order to introduce the required heat into the graphitic starting material to be expanded, the mold can be heated before the graphitic starting material is introduced.

Another possibility is to introduce the graphitic starting material into the mold and subsequently heat the mold to a temperature required for expanding the graphitic starting material.

Alternatively or additionally, the energy required for the expansion of the graphitic starting material can be directly introduced into such material.

In particular, the mold can be placed in an electrically, gas- or oil-heated furnace. Heating by means of an induction source is also possible.

If the energy required for expansion is to be introduced directly into the graphitic starting material, such heating can be performed using microwaves.

A further modification of the invention envisages that the used mold is a porous mold, in particular consisting of or containing silicon carbide, graphite, ceramics, sintered metal. A mold having ventilation openings and/or made of a porous or perforated material, such as metal, e.g., copper, may also be used.

Thus, all materials are suitable that are resistant to the temperatures to which the graphitic starting material is to be heated. Temperatures up to 1,000° C. are easily possible.

If closed-cell materials are used for the mold, through-passages are introduced to allow the gas produced during expansion to be discharged. The cross-section of such openings is smaller than the grain size of the particles of the starting material.

After the molded body has been formed, the phase change material can then be introduced. Preferably, pressureless capillary-driven infiltration is provided for, which has the advantage over the state-of-the-art vacuum-pressure process that the phase change material can permeate the molded body without leaving any residues. When using the vacuum-pressure process, on the other hand, residues are found to remain on the surface of a molded body that must be removed.

In pressureless infiltration (capillary-driven infiltration), adhesive and capillary forces are used such that the liquid impregnating agent penetrates into the porous body of its own accord.

It is possible, for example, to place impregnating agents in solid form on the body to be impregnated and to heat them up. The impregnating agent melts and penetrates into the body.

A further modification to be emphasized provides for producing the molded body with a recess into which a phase change material is introduced such that this then permeates into the molded bodies.

It is also possible that the molded body is placed in liquid phase change material and/or brought floatingly into contact with the phase change material to introduce the phase change material.

Particularly if the phase change material, such as wax, is filled into a recess in the molded body, precise dosing is possible.

Furthermore, the infiltration or impregnation of the molded body can be performed in a continuous furnace such that a high throughput can be achieved.

During such continuous process, i.e. using a continuous furnace, molded bodies can be produced as well.

Filtration takes place after the molded body has been removed from the mold.

Preferably, a graphitic starting material in the form of graphite salt having a bulk density between 0.1 g/ml to 0.9 g/ml, particularly 0.3 g/ml to 0.8 g/ml is used, wherein a bulk density in the range of 0.7 g/ml is to be preferred.

The grain size of the starting material can have, for example, the following distribution: D10=130 µm, D50=240 µm, D90=360 µm.

Good results can also be achieved if 80% of the grains have dimensions of less than 150 µm In particular, it is envisaged that the grain size of the graphite salt is D50=50 µm to 400 µm.

According to the teaching of the invention, a molded body of the desired geometry can be easily produced without the need for general processing after expansion since the mold itself defines the desired geometry of the molded body. Thus, geometrically complex molded bodies can be produced, a possibility not provided by the state of the art.

The invention also proposes the pressureless infiltration (capillary-driven infiltration) of the molded body, and thus independent of the production of the molded body, wherein the dosed introduction into a recess in the molded body or bringing floatingly into contact with the phase change material is to be particularly emphasized.

The invention further relates to a latent heat storage device consisting of a molded body that has been infiltrated with phase change material and, in particular, has been produced according to process steps as explained hereinbefore. In this context, the molding by means of the mold in which the graphitic starting material is expanded and the pressureless capillary-driven infiltration are to be particularly emphasized.

In particular, it is envisaged that the molded body without phase change material has a porosity between 64% and 99.4%.

Furthermore, the molded body should have a gross density between 0.014 g/cm$^3$ and 0.79 g/cm$^3$.

The volume fraction of the expanded graphitic starting material to the volume fraction of the phase change material in the molded body should be between 1:2 and 1:10.

Further details, advantages and features of the invention will become apparent not only from the claims, the features described therein individually and/or in combination but also from the following description of the preferred embodiments defined in the drawings.

Figure 1:
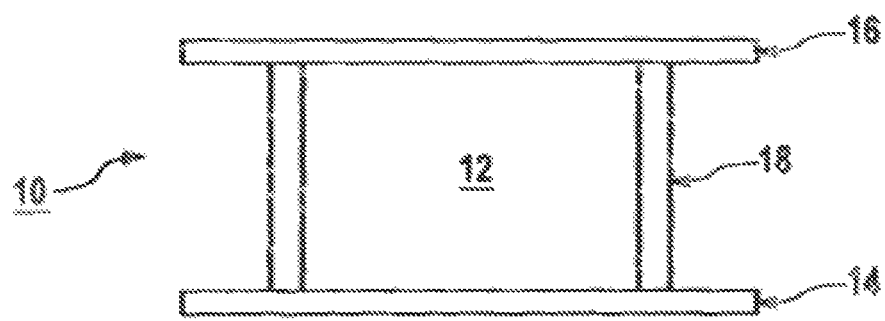
FIG. 1 is a schematic representation of a mold for producing a molded body.

FIG. 1 shows a schematic representation of a mold 10, by means of which a molded body of expanded graphite salt for a latent heat accumulator is to be produced, wherein the interior 12 of the mold 10 defines the outer geometry of the molded body.

In the exemplary embodiment, the mold 12 consists of a bottom part 14, a cover part 16 and a peripheral wall 18 extending therebetween, which can be a hollow cylinder section, for example.

Independently thereof, the bottom part 14, cover part 16 and peripheral wall 18 can have the desired internal geometries that are designed according to the shape of the molded part to be produced.

A defined quantity of graphite salt is introduced into the interior 12.

Usually, a well-ordered, highly crystalline, natural flake graphite is used for producing graphite salt. This is converted into a graphite salt by means of an intercalation agent.

The graphite salt is expanded or bloated by a thermal shock treatment. During this process, the intercalation agent escapes. The graphite flakes increase their volume by a factor of up to 400.

The treatment is carried out using acids such that acid radicals, such as sulfates or nitrates, are intercalated between the graphite layers.

After closing the interior 12, the mold 10 is positioned e.g., in a furnace in order to introduce the necessary heat into the graphite salt such that it can expand, wherein the expanded graphite salt fills the entire interior 12 of the mold 10.

Figure 2:
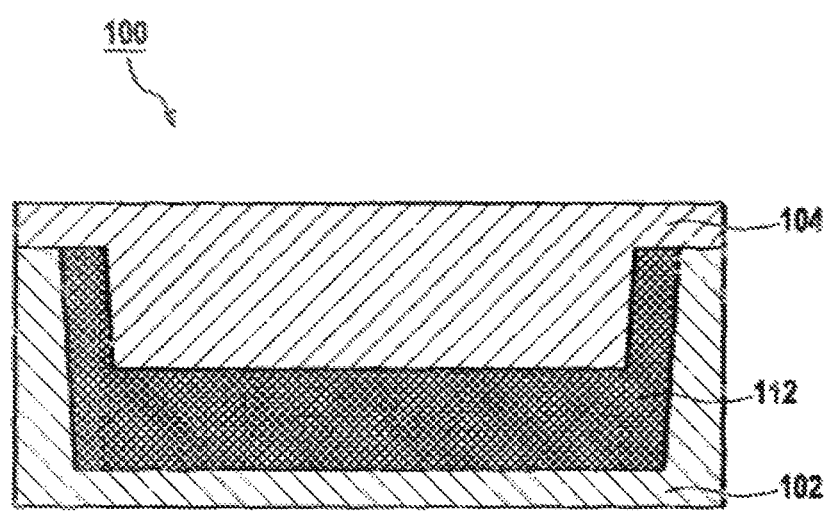
FIG. 2 is a schematic representation of another mold for producing a molded body.

FIG. 2 shows another schematic representation of a mold 100, which consists of a pot-shaped bottom part 102 and an upper part 104. As the sectional view shows, the bottom part 102 and the upper part 104 define an interior 112 having a U-shaped cross section and defining the shape of the expanded graphite that is produced. Irrespective of the fact that the cross section of the molded part is considerably reduced in the upper edge area compared to the bottom area, a uniform compaction and homogeneous pore structure of the expanded molded body is achieved based on the teaching of the invention according to which the molding takes place during the expansion of the graphite salt that is to be introduced into the mold 100 and according to which the shape is not achieved after expansion under pressure—as in the state of the art.

The expanded molded body remains dimensionally stable as the expanded particles adhere to each other due to adhesive forces and mechanical anchoring (interlocking).

If a mold is to be produced according to the state of the art which corresponds to that shown in FIG. 2, disadvantages would result with respect to pore structure and channel cross sections in the upper area due to the reduction in cross section compared to the bottom area and the different pressures exerted as a result, which in turn have a detrimental effect when the molded body is infiltrated with a phase change material.

An electrically heated, gas- or oil-heated furnace can be used to introduce the heat into the mold 10 or 100. An induction furnace is also an option. Another possibility is that the graphite salt is heated by microwaves.

The amount of graphite salt that to be introduced into the interior 12, 112 depends on the one hand on the desired porosity to be achieved and on the other hand on the temperature at which the expansion—also known as bloating—is to take place.

The material of mold 10, 100 must be selected such that a permeability is ensured for the propellant gas escaping during inflation. Suitable materials are, e.g., inherently porous materials, such as silicon carbide, graphite, ceramics or sintered metal. However, a perforated metal is also an option. It is essential that the through passages are smaller than the graphite salt's grain size.

The graphite salt used can be, e.g., a graphite salt having a bulk density in the range between 0.1 g/ml and 0.9 g/ml. The grain size distribution of the graphite salt can be, e.g.: D10=130 µm, D50=240 µm and D90=360 µm. However, these values are not to be understood as limiting in terms of protection.

Good results can also be achieved if 80% of the grains have dimensions of less than 150 µm.

Particularly in industrial production, molded bodies should be produced in a continuous process. For this purpose, corresponding molds can be fed through a continuous furnace.

After expanding the graphite salt and cooling the form 10, 100 the molded body having a defined geometry which is, as mentioned, defined by the internal geometry of the interior 12, 112 is removed. Subsequently, the molded body is preferably impregnated or infiltrated with a phase change material (PCM) by pressureless capillary-driven infiltration. Either a solid phase change material can be applied to the molded part, which is then melted, e.g., in the temperature range up to 150° C. to enable infiltration. Or, it is also possible to immerse the molded body in a liquid phase change material bath or to position it floatingly therein such that pressureless capillary-driven infiltration is enabled.

Suitable phase change materials include in particular materials enabling a phase change in the temperature range between 60° C. and 300° C., especially in the range between 80° C. and 150° C. Preferred materials are waxes, such as paraffin, sugar, alcohol, inorganic salt or salt hydrate.

The ratio of phase change material to expanded graphite should be 10:1 to 2:1.

The gross density of the expanded graphite should be between 0.014 g/cm$^3$ and 0.79 g/cm$^3$. The gross density is temperature-dependent. At a temperature of 600° C., for example, the grains or flakes of the graphite salt can increase in volume by a factor of up to 100 and at a temperature of 1,000° C. by a factor of up to 400.

Due to the escaping gases, a loss in mass of the graphite material between 20% and 22% can occur, even if lower values, e.g., 10% are possible.

The following examples are intended to illustrate how the final porosity of the molded body depends on the quantity of graphite salt.

5 g of graphite salt are filled into a mold having an internal volume of 50 ml. This is kept at a temperature of 600° C. for 15 minutes and then demolded after cooling. Measurements have shown that the body has a density of 0.08 g/cm$^3$ and a porosity of 96.5%.

In a second experiment, 12 g of graphite salt are filled into the same mold having an internal volume of 50 ml. This is also heated at 600° C. for 15 min. After cooling and demolding, the body has a density of 0.19 g/cm$^3$ and a porosity of 91.5%. The compressive strength was tested on a corresponding molded body. This resulted in a value of 0.97 N/mm$^2$.

The invention claimed is:

1. A method for producing a latent heat accumulator, wherein a phase change material is introduced into a molded body produced by expanding a graphitic starting material, comprising:

introducing the graphitic starting material into a mold that predefines a shape of the molded body, closing the mold, expanding the graphitic starting material in the mold by introducing heat, wherein the mold is heated before, or after, the graphitic starting material is introduced, or the energy required for expansion is introduced directly into the graphitic starting material, and after the molded body has been formed, introducing the phase change material into the molded body.

2. The method according to claim 1, wherein the mold is a porous mold.

3. The method according to claim 2, wherein the porous mold comprises a member selected from the group consisting of silicon carbide, graphite, a ceramic, and a sintered metal.

4. The method according to claim 1, wherein the mold comprises ventilation openings and/or is made of a porous or perforated material.

5. The method according to claim 4, wherein the perforated material is a perforated metal.

6. The method according to claim 5, wherein the perforated metal is copper.

7. The method according to claim 1, wherein the mold comprises a closed interior receiving the graphitic starting material that corresponds to a negative mold of the molded body.

8. The method according to claim 1, wherein the phase change material is introduced into the molded body by pressureless infiltration.

9. The method according to claim 8, wherein the pressureless infiltration is a capillary-driven infiltration.

10. The method according to claim 1, wherein the molded body is produced with a recess into which phase change material is introduced.

11. The method according to claim 1, wherein the molded body is stored in liquid phase change material and/or brought floatingly into contact with the phase change material to introduce the phase change material.

12. The method according to claim 1, wherein the graphitic starting material is a graphite salt having a bulk density between 0.1 g/ml and 0.9 g/ml.

13. The method according to claim 12, wherein the bulk density is between 0.3 g/ml and 0.8 g/ml.

* * * * *